United States Patent [19]
VanVoorhies

[11] Patent Number: 5,918,696
[45] Date of Patent: Jul. 6, 1999

[54] SEAT WEIGHT SENSOR WITH MEANS FOR DISTRIBUTING LOADS

[75] Inventor: Kurt L. VanVoorhies, Detour Village, Mich.

[73] Assignee: Automotive Systems Laboratory, Inc., Farmington Hills, Mich.

[21] Appl. No.: 09/003,868

[22] Filed: Jan. 7, 1998

Related U.S. Application Data

[60] Provisional application No. 60/058,084, Sep. 5, 1997.

[51] Int. Cl.$^6$ .................................................. B60K 28/00
[52] U.S. Cl. ..................... 180/273; 280/735; 297/DIG. 3
[58] Field of Search ..................................... 180/273, 271; 280/735, 734; 297/DIG. 3, 199

[56] References Cited

U.S. PATENT DOCUMENTS

| | | | |
|---|---|---|---|
| 1,232,983 | 7/1917 | Schenk | 177/254 |
| 1,969,927 | 8/1934 | Heden | 180/273 |
| 4,022,146 | 5/1977 | Sadler | 180/273 |
| 4,056,156 | 11/1977 | Dayton | 177/209 |
| 4,219,090 | 8/1980 | Dayton | 177/208 |
| 4,957,286 | 9/1990 | Persons, II et al. | 272/73 |
| 4,987,898 | 1/1991 | Sones | 128/645 |
| 5,176,424 | 1/1993 | Tobita et al. | 297/284.1 |
| 5,430,275 | 7/1995 | Braunisch | 219/708 |
| 5,573,269 | 11/1996 | Gentry et al. | 280/735 |
| 5,640,728 | 6/1997 | Graebe | 5/606 |
| 5,709,404 | 1/1998 | Brooks | 280/735 |
| 5,739,757 | 4/1998 | Gioutsos | 340/667 |
| 5,827,081 | 11/1998 | Pearce | 65/654 |

*Primary Examiner*—Christopher P. Ellis
*Attorney, Agent, or Firm*—Lyon, P.C.

[57] ABSTRACT

A hydrostatic weight sensor incorporates a load distributor to prevent the bladder of the hydrostatic weight sensor from bottoming out under the influence of applied loads of sufficient concentration and magnitude. The load distributor comprises a flexible mat proximate a load bearing surface of the hydrostatic weight sensor, wherein the flexible mat may be constructed from slitted, punched, pierced, or expanded semi-rigid sheet, a multi-layer plurality of such sheets, or a woven assembly of a plurality of semi-rigid strips. The load distributor is sufficiently flexible to not interfere with seating comfort, yet sufficiently stiff to prevent the bladder of the hydrostatic weight sensor from bottoming out as a result of concentrated loading.

5 Claims, 3 Drawing Sheets

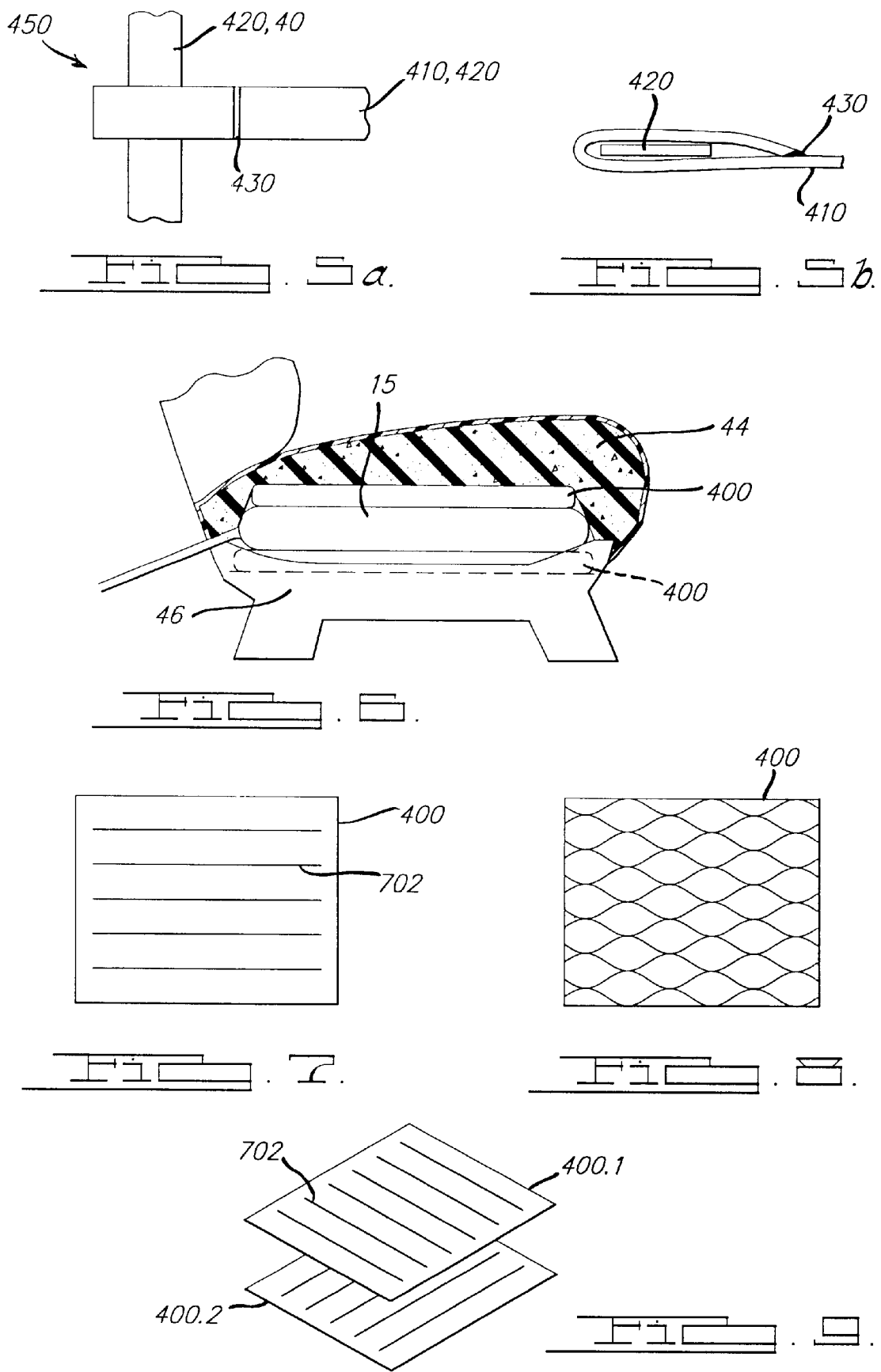

5,918,696

SEAT WEIGHT SENSOR WITH MEANS FOR DISTRIBUTING LOADS

CROSS-REFERENCE TO RELATED APPLICATIONS

The instant application claims the benefit of U.S. Provisional Application Ser. No. 60/058,084 filed on Sep. 5, 1997.

Co-pending U.S. Application Ser. No. 08/933,701, hereinafter "Application ASL-157-US", entitled "Seat Weight Sensor Having Fluid Filled Bladder", filed on Dec. 18, 1997 claiming benefit of U.S. Provisional Application Ser. No. 60/032,380 filed on Dec. 19, 1996, and assigned to the assignee of the instant invention discloses a hydrostatic weight sensor comprising a fluid filled bladder and a pressure sensor for sensing the weight of an occupant in a vehicle seat for controlling a safety restraint system. Application ASL-157-US also discloses a load distributor for distributing loads across the load bearing surface of the hydrostatic weight sensor.

Co-pending U.S. Application Ser. No. 09/003,672, hereinafter "Application ASL-161-US", entitled "Automotive Seat Weight Sensing System", filed on Jan. 7, 1998 claiming benefit of U.S. Provisional Application Ser. No. 60/034,018 filed on Jan. 8, 1997, and assigned to the assignee of the instant invention discloses a seat weight sensing system comprising a plurality of hydrostatic weight sensors each of which is in accordance with Application ASL-157-US.

Co-pending U.S. Application Ser. No. 09/003,870, hereinafter "Application ASL-163-US", entitled "Vehicle Seat Sensor Having Self-Maintaining Air Bladder", filed on Jan. 7, 1998 claiming benefit of U.S. Provisional Application Ser. No. 60/035,343 filed on Jan. 16, 1997, and assigned to the assignee of the instant invention discloses an apparatus for automatically maintaining the supply of sensing fluid in a hydrostatic weight sensor.

Co-pending U.S. Application Ser. No. 09/003,857, hereinafter "Application ASL-185-US", entitled "Seat Weight Sensor Having Self-Regulating Fluid Filled Bladder", filed on Jan. 7, 1998 claiming benefit of U.S. Provisional Application Ser. No. 60/058,086 filed on Sep. 5, 1997, and assigned to the assignee of the instant invention discloses a hydrostatic weight sensor having a means for automatically regulating the amount of sensing fluid therein.

Co-pending U.S. Application Ser. No. 09/003,673, hereinafter "Application ASL-187-US", entitled "Seat Weight Sensor Having Self-Regulating Fluid Filled Bladder", filed on Jan. 7, 1997 claiming benefit of U.S. Provisional Application Ser. No. 60/058,119 filed on Sep. 5, 1997, and assigned to the assignee of the instant invention discloses a hydrostatic weight sensor having a means for automatically regulating the amount of sensing fluid therein.

Co-pending U.S. Application Ser. No. 09/003,850, hereinafter "Application ASL-193-US", entitled "Altitude/Temperature Compensation for a Gas-Filled Weight Sensor", filed on Jan. 7, 1997 claiming benefit of U.S. Provisional Application Ser. No. 60/065,334 filed on Nov. 13, 1997, and assigned to the assignee of the instant invention discloses a hydrostatic weight sensor comprising a pair of hydrostatic weight sensors in series with one another but having a different sensitivity with respect to variations in temperature or ambient pressure.

Co-pending U.S. Application Ser. No. 09/003/846, hereinafter "Application ASL-194-US", entitled "Seat Weight Sensor Using Fluid Filled Tubing", filed on Jan. 7, 1997 claiming benefit of U.S. Provisional Application Ser. No. 60/065,986 filed on Nov. 17, 1997, and assigned to the assignee of the instant invention discloses a hydrostatic weight sensor incorporating a fluid filled tube.

All of the above referenced U.S. Applications and U.S. Provisional Applications are incorporated herein by reference.

Co-pending U.S. Application Ser. No. 003,744, hereinafter "Application ASL-195-US", entitled "Low Profile Hydraulic Seat Weight Sensor", filed on Jan. 7, 1997 claiming benefit of U.S. Provisional Application Ser. No. 60/065,832 filed on Nov. 14, 1997, and assigned to the assignee of the instant invention discloses a hydrostatic weight sensor constructed from constructed from plates or sheets of semi-rigid material and filled with a liquid, grease, Bingham fluid or thixotropic material.

TECHNICAL ART

The instant invention generally relates to sensors and systems for measuring weight and more particularly to a weight sensor for measuring the weight of occupants and other objects in a motor vehicle seat such as useful for determining occupant seating conditions for controlling a vehicle safety restraint system.

BACKGROUND OF THE INVENTION

A vehicle may contain automatic safety restraint actuators which are activated responsive to a vehicle crash for purposes of mitigating occupant injury. Examples of such restraint actuators include air bags, seat belt pretensioners, and deployable knee bolsters.

One objective of an automatic safety restraint system is to mitigate occupant injury, thereby not causing more injury with the automatic restraint system than would be caused by the crash had the automatic restraint system not been activated. Notwithstanding the protective benefit of these automatic safety restraint actuators, there is generally both a risk and a cost associated with the deployment thereof. Generally, it is desirable to only activate automatic safety restraint actuators when needed to mitigate injury because of the expense of replacing the associated components of the safety restraint system, and because of the potential for such activations to harm occupants. This is particularly true of air bag restraint systems, wherein occupants too close to the air bag at the time of deployment—i.e. out-of-position occupants—are vulnerable to injury or death from the deploying air bag even when the associated vehicle crash is relatively mild. Moreover, occupants who are of small stature or with weak constitution, such as children, small adults or people with frail bones are particularly vulnerable to injury induced by the air bag inflator. Furthermore, infants properly secured in a normally positioned rear facing infant seat (RFIS) in proximity to a front seat passenger-side air bag are also vulnerable to injury or death from the deploying air bag because of the close proximity of the infant seat's rear surface to the air bag inflator module.

While air bags are designed to protect vehicle occupants, conventional crash detection and safety restraint deployment systems only use sensors which are mounted on the vehicle frame and are triggered by acceleration or velocity of the car rather than the occupant. Accordingly, conventional deployment strategies are not directly based on the weight, stature, and position of vehicle occupants. It is often very difficult to discriminate between crashes where air bags should be deployed and when their deployment could cause more harm than benefit. This difficult decision is typically made using only one or as few as possible sensors mounted on the vehicle. In the future, more occupant safety strategies will be available, including seat belt pre-tensioning and multi-stage air bags. With more available options, the deployment decision will become more complicated and require additional real-time occupant position data.

Air bag inflators are designed with a given restraint capacity, as for example, the capacity to protect an unbelted normally seated fiftieth percentile occupant when subjected to a 30 MPH barrier equivalent crash, which results in associated energy and power levels which can be injurious to out-of-position occupants. While relatively infrequent, cases of injury or death caused by air bag inflators in crashes for which the occupants would have otherwise survived relatively unharmed have provided the impetus to reduce or eliminate the potential for air bag inflators to injure the occupants which they are intended to protect.

One technique for mitigating injury to occupants by the air bag inflator is to reduce the power and energy levels of the associated air bag inflator, for example by reducing the amount of gas generant in the air bag inflator, or the inflation rate thereof. This reduces the risk of harm to occupants by the air bag inflator while simultaneously reducing the restraint capacity of the air bag inflator, which places occupants a greater risk for injury when exposed to higher severity crashes.

Another technique for mitigating injury to occupants by the air bag inflator is to control the rate of inflation rate or the capacity of the inflator responsive to a measure of the severity of the crash. However, the risk of injury to such occupants would not be mitigated under the conditions of higher crash severity when the inflator is intentionally made aggressive in order to provide sufficient restraint for normally positioned occupants.

Yet another technique for mitigating injury to occupants by the air bag inflator is to control the activation of the air bag inflator responsive to the presence, position, and size of the occupant, or to the severity of the crash. For example, the air bag inflator can be disabled if the occupant weight is below a given threshold. Moreover, the inflation capacity can be adjusted by controlling the number of inflation stages of a multi-stage inflator that are activated. Furthermore, the inflation power can be adjusted by controlling the time delay between the firings of respective stages of a multi-stage inflator.

One measure of restraint capacity of an air bag inflator is the amount of occupant kinetic energy that can be absorbed by the associated air bag system, whereby when the occupant collides with the gas filled air bag, the kinetic energy of the occupant is converted to potential energy via the pressurization of the air bag, and this potential energy is dissipated by venting pressurized gases from the air bag. As a vehicle in a crash is decelerated, the velocity of an unrestrained occupant relative to the vehicle increases.

Preferably, the occupant restraint process is commenced early in the crash event so as to limit the amount of occupant kinetic energy which must be absorbed and thereby minimize the associated restraint forces and accelerations of and loads within the occupant. If the occupant were a simple inertial mass without friction relative to the vehicle, the kinetic energy of the occupant would be given by $\frac{1}{2} M \cdot V^2$, where M is the mass of the occupant and V is the occupant velocity relative to the vehicle. If a real occupant were represented by an interconnected set of bodies, some of which have friction relative to the vehicle, each body of which may have differing velocities relative the vehicle, the above equation would apply to the motion of the center of gravity of the occupant. Regardless of the representation, occupants of larger mass will have a larger kinetic energy for the same velocity relative to the vehicle. Therefore, an occupant weight sensor is useful in an air bag system with variable restraint capacity to enable the restraint capacity to be preferentially adapted to the weight, or mass, of the occupant.

Except for some cases of oblique or side-impact crashes, it is generally desirable to not activate an automatic safety restraint actuator if an associated occupant is not present because of the otherwise unnecessary costs and inconveniences associated with the replacement of a deployed air bag inflation system. Occupant presence can be detected by a seat weight sensor adapted to provide either a continuous measure of occupant weight or to provide a binary indication if the occupant weight is either above or below a specified weight threshold.

Known seat weight sensors comprise one or more pads employing force sensitive resistive (FSR) films. These arrangements are typically used as weight threshold systems to disable a passenger air bag when the seat is empty. Load cells attached to the seat mounting posts have also been used in research applications. Mechanisms which use string based potentiometers to measure downward seat displacement have also been investigated.

Such known arrangements suffer from several drawbacks. First, variable resistance force sensors have limited sensitivity and in some situations are not sensitive enough to put directly under a seat pad while still achieving the desired response. Second, the threshold weight system provides only very limited information. For example, such arrangements provide no indication as to the size of an occupant. Third, the resistance values of known variable force resistor change with temperature, and are subject to drift over time with a constant load on the sensor.

Furthermore, other known sensing arrangements do not otherwise provide suitable results. For example, the use of load cells is prohibitively expensive for large-scale commercial applications. Strain gauges of any type may be impractical because of the difficulty in applying them to the strained material. Mechanical string potentiometer based weight sensors are complex, and subject to failure from stretching of the string. String potentiometer based weight sensors also suffer from a limitation whereby seat geometry changes over the lifetime of the seat. More specifically, seats tend to take a "set" over time so that the springs and cushion tend to move downward as the seat ages. A string potentiometer based weight sensor measuring downward displacement would require periodic recalibration over the lifetime of the seat. Finally, optical or infrared sensors have been used to measure the spatial position of occupants relative to the dashboard or headliner. Often these sensors are also integrated with speed sensors to discern changes in occupant position due to car acceleration. Current optical and infrared occupant position sensors require augmented information from speed and weight sensors, thereby resulting in a relatively high cost distributed system which may be difficult to manufacture, install, and maintain. Furthermore, optical and/or infrared sensors which measure the range from the headliner or dashboard can be confused by placement of objects in front of an occupant, such as when reading newspapers or books, or by the position of the seat back because many seats can recline fully back and incline fully forward. Moreover, the sensing aperture of these sensors may become occluded by inadvertent scratching or substance application.

Known seat weight sensing techniques generally require multiple points for sensing distributed weight accurately.

Also, force sensing resistors, load cells or membrane switches may require significant seat redesign for use in current or future seats. This is particularly true for spring type seats which do not provide a uniform horizontal support surface. The response time of load cells or membrane switches may fast enough for real-time applications.

The prior art also teaches the use of seat weight sensors outside the automotive environment, for example as a means for disabling the activation of either a boat or an industrial machine if the operator is not properly seated, or for weighing a person seated on an exercise bike. These devices employ pneumatic bladders located in the seat, whereby the pressure within the bladder is used to either activate a threshold switch or to provide a continuous indication of occupant weight.

One problem with prior art pneumatic sensors, particularly when applied to the automotive environment, is their sensitivity to environmental conditions, particularly to ambient temperature and pressure. This requires the bladder to be partially filled with fluid under ambient conditions of lower temperature or higher pressure, thereby making the bladder more susceptible to bottoming out when exposed to localized or concentrated loads and therefor requiring a means for distributing the loads over the load bearing area of the bladder. Pneumatic seat weight sensors can be sensitive to the amount of air initially in the associated bladder. A seat weight sensor in an automotive environment must function reliably and accurately over a wide range of temperatures and pressures which can cause significant errors.

Another problem with a pneumatic seat weight sensor is that the sensor bladder must be sufficiently thick to prevent the top and bottom surfaces of the bladder from compressing against one another responsive to a sufficiently great localized or concentrated load under conditions when the bladder has a relatively small amount of gas, such as would occur when the bladder is filled at low pressure or high temperature.

Yet another problem with a pneumatic seat weight sensor is that a gas filled bladder is also prone to loss of fluid by leakage or osmosis, which necessitates a means for replenishing the working fluid of the bladder over the life of operation.

The prior art also teaches the use of hydraulic load cells, wherein the weight to be measured acts upon a piston element of known area, whereby the measured weight is found by multiplying a measured pressure times the known area. One problem with hydraulic load cells in the automotive environment, particularly in a seat, is that the effects of load cell orientation on hydraulic head can introduce load measurement errors.

SUMMARY OF THE INVENTION

Generally, a pneumatic seat weight sensor comprises a gas filled bladder mounted in the seat, a means for distributing the weight to be measured over the surface of the bladder, and a means for indicating the weight on the seat by measuring the pressure within the bladder relative to the ambient pressure. The pneumatic seat weight sensor may further comprise a means for refilling the gas within the gas-filled bladder to account for losses over time.

The gas-filled bladder is preferably only partially filled to allow for gaseous expansion due to variations in ambient temperature and pressure, such that over the possible range of environmental operating conditions the volume of the unloaded gas-filled bladder generally does not exceed the design volume thereof. Moreover, under these conditions, the associated absolute pressure in the bladder would not exceed ambient pressure.

Under the action of a distributed load, the volume of the bladder decreases until the pressure therein is sufficiently great to support the load. For a bladder having a design shape of a rectangular slab having a height and two base dimensions, as the height decreases under the action of the load, the base dimensions increase, thereby increasing the base area of the bladder. The weight of the distributed load is then given by the product of the base area of the bladder times the difference in pressure inside and outside the bladder. Even if the loading on the top of the seat is relatively localized, the associated weight is given by the differential pressure acting on the base area of the bladder, assuming the base of the bladder is fully supported and that that top surface of the bladder is not locally compressed against the bottom surface.

As noted above, the bladder is preferably only partially filled under nominal ambient conditions. Therefore, the action of a concentrated load on the bladder would most likely cause the top surface of the bladder to bottom out on the bottom surface. This prevents a portion of the load from being supported by the gas within the bladder so that the corresponding differential pressure measurement would not properly indicate the full weight on the bladder. This condition can be alleviated by providing a means for distributing the load across the bladder, such as with the foam pad constituting the seat cushion.

Generally, the sensitivity of the gas filled bladder to ambient temperature and pressure is decreased with decreasing amounts of gas in the bladder, and with decreasing bladder thickness for the same base dimensions of the bladder. However, as the bladder is made thinner in overall height, and the amount of gas is reduced, the bladder becomes more susceptible to bottoming-out under the influence of localized loads applied to the seat.

The gas-filled bladder may be of sealed construction with a fixed initial amount of gas. Alternately, the bladder may be equipped with a filling valve to refill gas that is lost to either osmosis or leakage. Furthermore, the bladder may be equipped with a means to automatically refill this lost gas with the preferable amount of gas relative to the design volume of the bladder, generally about 30% to 50% of the design volume, and more particularly about 40%.

When incorporating a means for automatically refilling the bladder, the amount of gas in the bladder at any given time would likely not be known. The weight on the sensor is given by the expression $W = DP/A$, where DP is the differential pressure between the inside and outside of the bladder, and A is the base area of the bladder. The effect of the base area A of a partially filled bladder increasing with increasing load is included in the calibration. This effect is smaller for relatively thinner bladders, and is relatively insensitive to the fill conditions of the bladder.

In accordance with the instant invention, a hydrostatic weight sensor comprises a deformable confinement that contains a fluid, wherein the deformable confinement may constitute either a distinct chamber, or one chamber of a multi-chamber deformable confinement. The hydrostatic weight sensor further comprises either a pressure sensor operatively coupled to the deformable confinement for sensing the pressure of the fluid contained therein, or an means for operatively coupling a pressure sensor to the deformable confinement. The hydrostatic weight sensor may also comprise one or more of the following elements: 1) a means for replenishing the fluid within the deformable confinement, 2)

a means for releasing excessive fluid from the deformable confinement, or 3) a means for regulating the amount of fluid within the deformable confinement. The fluid contained by the deformable confinement may comprise either a gas, a liquid, a Bingham fluid, or a thixotropic material. Various types of pressure sensors may be incorporated into or associated with the hydrostatic weight sensor in accordance with the instant invention. For example, the pressure sensor may sense either the absolute pressure of the fluid within the deformable confinement, or the difference between the pressure thereof and the local atmospheric pressure. Furthermore, the pressure sensor may be either internal or external to the hydrostatic weight sensor, may be integrated therewith or separated therefrom, and may operate on any principles known to one of ordinary skill in the art, including the measurement of strain in the surface of the deformable confinement, or the measurement of pressure through the surface of the deformable confinement whereby the pressure sensor is isolated thereby from the fluid. Examples of various hydrostatic weight sensors in accordance with the instant invention are disclosed in Applications ASL-157-US, ASL-163-US, ASL-185-US, ASL-187-US, ASL-193-US, and ASL-194-US referenced hereinabove and incorporated herein by reference.

The instant invention provides a system and method for distributing seat loads across the load bearing surface of a hydrostatic weight sensor, thereby preventing concentrated loads from compressing the top surface of the bladder against the bottom surface. The element of the instant invention which distributes the loads across a load bearing surface of the hydrostatic weight sensor will be referred to as a load distributor.

In accordance with Application ASL-157-US, the gas filled bladder of a pneumatic hydrostatic weight sensor is sandwiched between top and bottom load distributing foam cushions. These foam cushions help to distribute loads over the surface of the bladder to prevent concentrated loads from bottoming out the top surface against the bottom surface. More particularly, this arrangement is effective in preventing the concentrated loads from the seat springs mounted in the seat frame from compressing the bottom surface of the bladder against the top surface of the bladder.

In further accordance with Application ASL-157-US, a sheet of material that is relatively rigid compared to the material from which the bladder is constructed, but with a flexibility comparable to that of the seat springs, is placed against one or both faces of the bladder to prevent concentrated loads from compressing the top and bottom surfaces of the bladder against one another.

In one aspect of the instant invention, a load distributor comprises one or more layers of slitted material proximate a load bearing surface of a hydrostatic weight sensor.

In another aspect of the instant invention, a load distributor comprises two or more layers of slitted material whereby the direction of the slits in each layer are distinct with respect to the directions of the slits in the other layers.

In yet another aspect of the instant invention, a load distributor comprises one or more layers of expanded material proximate a load bearing surface of a hydrostatic weight sensor.

In yet another aspect of the instant invention, a load distributor comprises a plurality of pieces of semi-rigid material proximate a load bearing surface of a hydrostatic weight sensor.

In yet another aspect of the instant invention, a load distributor comprises a flexible mat formed by weaving strips of relatively rigid material such as metal or plastic proximate a load bearing surface of a hydrostatic weight sensor to prevent concentrated loads from compressing the top and bottom surfaces of the bladder against one another.

Accordingly, one object of the instant invention is to provide an improved hydrostatic weight sensor which provides a consistent and accurate measure of the seat loading independent of the location of the source of weight on the seat.

A further object of the instant invention is to provide an improved hydrostatic weight sensor which provides a consistent and accurate measure of the seat loading independent of the size and distribution of the source of weight on the seat.

A yet further object of the instant invention is to provide an improved hydrostatic weight sensor which provides a consistent and accurate measure of the seat loading independent of the amount of weight on the seat.

A yet further object of the instant invention is to provide an improved hydrostatic weight sensor which operates under a wide range of ambient temperature and pressure conditions.

A yet further object of the instant invention is to provide an improved hydrostatic weight sensor which can distinguish between a rear facing infant seat, for which an air bag system is preferably not deployed, and other occupants for which an air bag system is preferably deployed in the event of a crash of sufficient severity.

A yet further object of the instant invention is to provide an improved hydrostatic weight sensor which can be incorporated into an intelligent safety restraint system for which the preferable mode of the activation of a controllable occupant restraint system is dependent upon the weight of the occupant.

A yet further object of the instant invention is to provide an improved hydrostatic weight sensor which does not interfere with occupant comfort.

A yet further object of the instant invention is to provide an improved hydrostatic weight sensor which is insensitive to the orientation of the seat.

A yet further object of the instant invention is to provide an improved hydrostatic weight sensor which is inexpensive to produce.

In accordance with these objectives, one feature of the instant invention is a fluid filled bladder mounted in the base of the seat.

Another feature of the instant invention is a pressure sensor operatively coupled to the fluid filled bladder for measuring the pressure therein.

Yet another feature of the instant invention is a differential pressure sensor operatively coupled to the fluid filled bag for measuring the pressure therein relative to local atmospheric pressure.

Yet another feature of the instant invention is the incorporation of a gas as the fluid in the fluid filled bladder, wherein under conditions of standard pressure and temperature, the bladder is only partially filled.

Yet another feature of the instant invention is the incorporation of a means for compensating the effects of ambient temperature and pressure.

Yet another feature of the instant invention is a pair of foam cushions sandwiching the bladder which act to distribute applied loads across the surface of the bladder.

Yet another feature of the instant invention is the incorporation of one or more sheets of material placed against one or both faces of the bladder sufficiently flexible to provide a comfortable seat, but which is relatively rigid compared with the material from which the bladder is constructed, to distribute applied loads across the surface of the bladder and to prevent concentrated loads from compressing the top and bottom surfaces of the bladder together.

Yet another feature of the instant invention is the incorporation of one or more flexible woven mats placed against one or both faces of the bladder, constructed from strips of relatively rigid material to distribute applied loads across the surface of the bladder and to prevent concentrated loads from compressing the top and bottom surfaces of the bladder together.

The specific features of the instant invention provide a number of associated advantages. One advantage of the instant invention with respect to the prior art is that the gas-filled bladder is responsive to loads over a large area of the seat without regards to the distribution or amount of loading.

Another advantage of the instant invention is that the gas-filled bladder is automatically maintained in a partially-filled state so as enable the hydrostatic weight sensor to work consistently and accurately over a wide range of ambient pressures and temperatures.

Yet another advantage of the instant invention is that the hydrostatic weight sensor thereof can enable a rear facing infant seat to be distinguished from an occupant for which the air bag system is preferably deployed.

Yet another advantage of the instant invention is that the hydrostatic weight sensor thereof is sufficiently robust and accurate to enable associated occupant weight dependent control of a controllable occupant restraint system.

Accordingly, the instant invention provides an improved hydrostatic weight sensor which is relatively insensitive to the effects of ambient temperature and pressure; which is simple in construction and relatively robust and reliable in operation; which can be readily incorporated into an automotive seat without interfering with occupant comfort; and which can be produced relatively inexpensively.

The instant invention will be more fully understood after reading the following detailed description of the preferred embodiment with reference to the accompanying drawings. While this description will illustrate the application of the instant invention in an automotive safety restraint system, it will be understood by one with ordinary skill in the art that the instant invention can also be applied to other systems for weighing objects.

BRIEF DESCRIPTION OF THE DRAWINGS

FIGS. 5a and 5b illustrate construction details of the woven mat of FIG. 4.

FIG. 6 illustrates the instant invention incorporating the woven mat of FIG. 4.

FIG. 7 illustrates a load distributor constructed from a slit, pierced or punched material in accordance with the instant invention.

FIG. 8 illustrates a load distributor constructed from an expanded material in accordance with the instant invention.

FIG. 9 illustrates a load distributor comprising a plurality of layers in accordance with the instant invention.

DETAILED DESCRIPTION OF THE PREFERRED EMBODIMENT(S)

Figure 1:
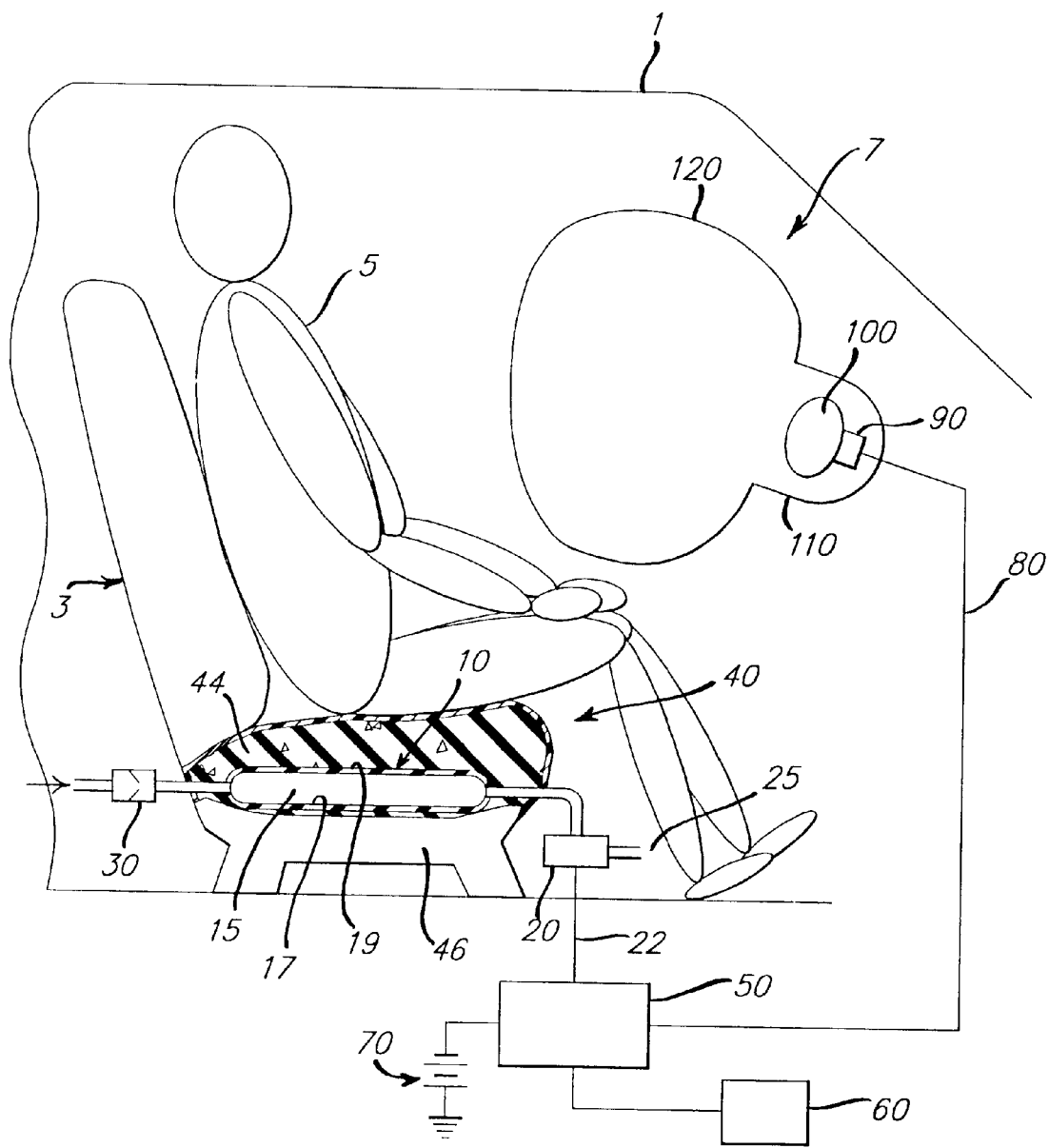
FIG. 1 illustrates one possible environment of the instant invention.

Referring to FIG. 1, a seat 3 in a motor vehicle 1 incorporates a pneumatic hydrostatic weight sensor 10 mounted in the seat base 40. The pneumatic hydrostatic weight sensor 10 comprises a fluid-filled bladder 15, a check valve 30 for admitting fluid into the bladder 15, and a differential pressure sensor 20 for measuring the difference in pressure between the bladder 15 and the atmosphere 25. The bladder 15 is sandwiched between the seat frame 46 below and the seat cushion foam 44 above. A check valve 30 admits air into the bladder 15 when the ambient pressure 25 is greater than the bladder 15 pressure, generally responsive to a means internal to the bladder 15 for regulating the amount of fluid in the bladder 15.

In operation, an occupant 5 seated on the base 40 of seat 3 causes the pressure inside the bladder 15 to increase such that that product of the differential pressure, as sensed by differential pressure sensor 20, multiplied times the area of the base 17 of the bladder 15 is equal to the total weight distributed by the seat cushion foam 44 over the top 19 of the bladder 15. The bladder 15 is preferably partially filled with gas so that over the expected range of ambient temperatures and pressures the pressure in an unloaded bladder 15 does not exceed ambient pressure. The pressure signal output 22 from differential pressure sensor 20 is operatively coupled to a signal processor 50 which converts the pressure signal output 22 to a measure of occupant weight using known analog, digital, or microprocessor circuitry and software. A crash sensor 60 is also operatively coupled to the signal processor 50. Responsive to a crash detected by the crash sensor 60, and further responsive to the sensed weight of the occupant as transformed from the pressure signal output 22, the signal processor 50 generates a signal 80 which is operatively coupled to one or more initiators 90 of one or more gas generators 100 mounted in an air bag inflator module 110, thereby controlling the activation of the air bag inflator module assembly 7 so as to inflate the air bag 120 as necessary to protect the occupant 5 from injury which might otherwise be caused by the crash. The electrical power necessary to carry out these operations is provided by a source of power 70, preferably the vehicle battery.

Figure 2:
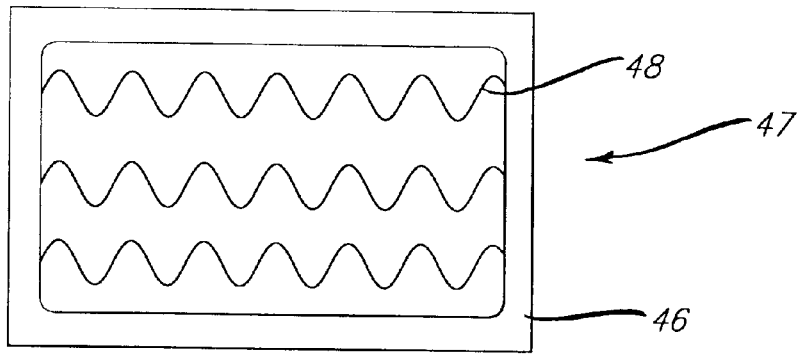
FIG. 2 illustrates the top view of an automotive seat frame.
Figure 3:
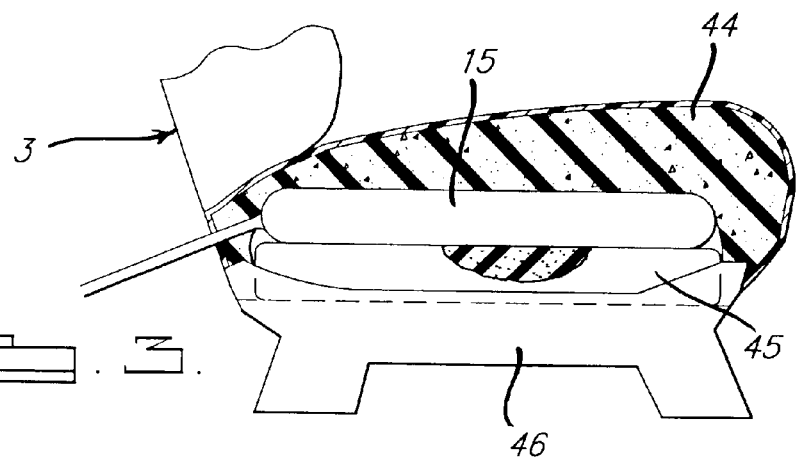
FIG. 3 illustrates the bladder of a pneumatic hydrostatic weight sensor sandwiched between load distributing foam cushions.

Concentrated loads from either the top or bottom of the bladder 15 can adversely affect the performance of the associated pneumatic hydrostatic weight sensor 10 if the loads are sufficiently great or sufficiently concentrated to cause the top and bottom surfaces of the bladder to become compressed against one another and thereby create an alternate, unsensed load path through the bladder. FIG. 2 illustrates a typical support structure of a seat frame assembly 47 comprising a seat frame 46 and seat springs 48 which are disposed across the internal opening of the seat frame. Displacement of the seat cushion 44 on the seat springs 48 through the opening in the seat frame 46 provides for seating comfort. The seat springs 48 can become a source of concentrated load if the bladder 15 of a pneumatic hydrostatic weight sensor 10 is supported strictly thereby. One possible way to alleviate this problem is to incorporate an additional foam cushion 45 below the bladder 15 as illustrated in FIG. 3.

Under some conditions, particularly if the foam cushions 44 an 45 are either not sufficiently thick or stiff, if the seat load is sufficiently great or concentrated, or if the volume of gas is sufficiently small as might occur during conditions of high pressure or low temperature, the seat load may be able to penetrate foam cushions 44 or 45 and thereby cause compression of the top and bottom surfaces of the bladder 15 against one another.

Figure 4:
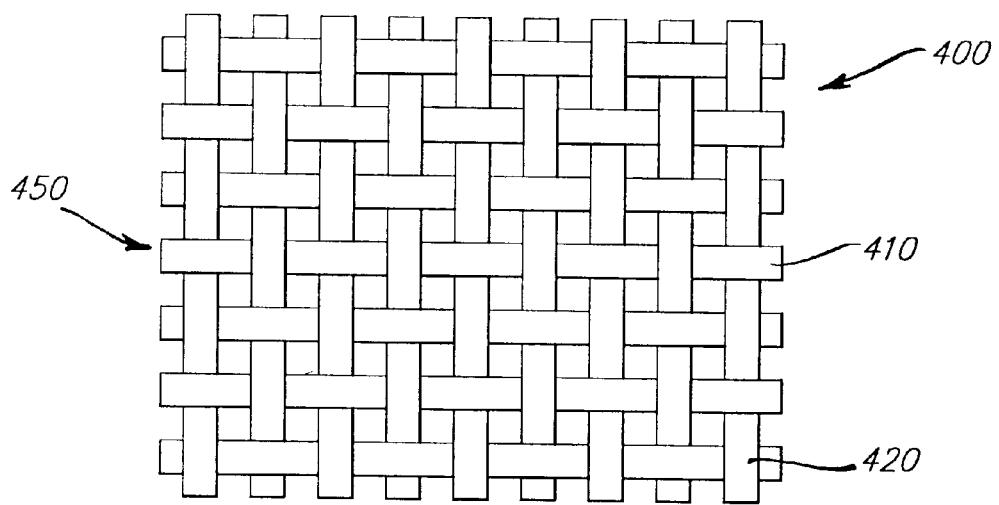
FIG. 4 illustrates a woven mat for use as a means of distributing loads across the surface of a bladder.

FIGS. 4–6 illustrate an arrangement for protecting either surface of the bladder 15 from such concentrated loads, wherein a mat 400 is constructed by weaving relatively thin strips 410, 420 of relatively stiff material, such as steel, aluminum, plastic, a composite, or other material with relatively similar properties. A mat 400 so constructed is relatively resistant to penetration by concentrated loads, yet relatively flexible so as to conform with deformations of the seat cushion 44 and seat springs 48 and thereby provide comfort for the seated occupant. FIGS. 5a and 5b illustrate one possible arrangement for preventing the mat from becoming unwoven wherein the ends 450 of the strips 410,420 are wrapped around and over the associated interwoven peripheral strip 420,410. The end of the strip 410,420 may be secured to the strip itself by a weld 430, fastener or adhesive. Alternately, the strips 410,420 may be pivotally or slideably secured to one another at the ends of each strip 410,420. The mat 400 is placed adjacent either one or both outside faces of the bladder 15 as illustrated in FIG. 6. Alternately, the mat 400 may be replaced by a sheet of plastic which is relatively rigid and puncture resistant in comparison with the bladder, but which is sufficiently flexible so as to not interfere with seating comfort. The mat 400 may also be constructed of a slit, pierced or punched material—equivalents within the context of the instant invention,—as illustrated in FIG. 7, or an expanded material as illustrated in FIG. 8. The mat 400 may also comprise a plurality of layers, for example as illustrated in FIG. 9 which shows two layers 400.1 and 400.2 of slitted material, wherein the directions of the slits 702 in the respective layers are distinct from one another.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

1. A sensor for sensing the weight of an occupant on a vehicle seat, comprising:
    a. a hydrostatic weight sensor located within the vehicle seat, said hydrostatic weight sensor incorporates a pressure sensor for generating a signal responsive to the pressure of the sensing fluid within said hydrostatic weight sensor, and said pressure is responsive to the component of occupant weight applied by the occupant on the vehicle seat to said hydrostatic weight sensor;
    b. a load distributor comprising one or more layers of slitted material proximate a load bearing surface of said hydrostatic weight sensor.

2. A sensor for sensing the weight of an occupant on a vehicle seat, comprising:
    a. a hydrostatic weight sensor located within the vehicle seat, said hydrostatic weight sensor incorporates a pressure sensor for generating a signal responsive to the pressure of the sensing fluid within said hydrostatic weight sensor, and said pressure is responsive to the component of occupant weight applied by the occupant on the vehicle seat to said hydrostatic weight sensor;
    b. a load distributor comprising one or more layers of expanded material proximate a load bearing surface of said hydrostatic weight sensor.

3. A sensor for sensing the weight of an occupant on a vehicle seat, comprising:
    a. a hydrostatic weight sensor located within the vehicle seat, said hydrostatic weight sensor incorporates a pressure sensor for generating a signal responsive to the pressure of the sensing fluid within said hydrostatic weight sensor, and said pressure is responsive to the component of occupant weight applied by the occupant on the vehicle seat to said hydrostatic weight sensor;
    b. a load distributor comprising a plurality of pieces of semi-rigid material proximate a load bearing surface of said hydrostatic weight sensor.

4. A sensor for sensing the weight of an occupant on a vehicle seat as recited in claim 3, wherein said plurality of pieces comprises a plurality of strips that are woven together.

5. A system for sensing the weight of an occupant on a vehicle seat as recited in claim 1, wherein said load distributor comprises a plurality of layers and the directions of the slits in each respective layer are distinct.

* * * * *